US010651996B2

(12) United States Patent
Huang et al.

(10) Patent No.: US 10,651,996 B2
(45) Date of Patent: May 12, 2020

(54) TECHNIQUES FOR DYNAMIC DEMODULATION REFERENCE SIGNAL PATTERNS FOR DATA TRANSMISSION

(71) Applicant: QUALCOMM Incorporated, San Diego, CA (US)

(72) Inventors: Yi Huang, San Diego, CA (US); Hao Xu, San Diego, CA (US); Wanshi Chen, San Diego, CA (US); Wei Zeng, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 468 days.

(21) Appl. No.: 15/493,922

(22) Filed: Apr. 21, 2017

(65) Prior Publication Data

US 2018/0091276 A1 Mar. 29, 2018

Related U.S. Application Data

(60) Provisional application No. 62/401,658, filed on Sep. 29, 2016.

(51) Int. Cl.
*H04L 5/00* (2006.01)
*H04W 48/12* (2009.01)
(Continued)

(52) U.S. Cl.
CPC .......... *H04L 5/0051* (2013.01); *H04L 1/1812* (2013.01); *H04L 5/00* (2013.01); *H04W 24/02* (2013.01); *H04W 48/12* (2013.01)

(58) Field of Classification Search
CPC combination set(s) only.
See application file for complete search history.

(56) References Cited

U.S. PATENT DOCUMENTS

2010/0246527 A1* 9/2010 Montojo ............. H04L 25/0226
370/330
2011/0141987 A1* 6/2011 Nam ..................... H04L 1/0003
370/329
(Continued)

FOREIGN PATENT DOCUMENTS

WO WO-2014/113971 A1 7/2014
WO WO-2014/126519 A1 8/2014

OTHER PUBLICATIONS

CMCC: "DMRS Indication in DL Enhanced Multiple Antenna Transmission," 3GPP Draft; R1-105273; 3rd Generation Partnership Project (3GPP), Mobile Competence Centre; 650, Route Des Lucioles; F-06921 Sophia-Antipolis Cedex; France, vol. RAN WG1, No. Xi'an, China; Oct. 14, 2010 (Oct. 14, 2010), 9 pages, XP050489301, [retrieved on Oct. 14, 2010].
(Continued)

*Primary Examiner* — Hicham B Foud
(74) *Attorney, Agent, or Firm* — Arent Fox, LLP

(57) ABSTRACT

Methods and apparatuses for demodulation reference signal (DMRS) transmission are described. At a user equipment (UE), a method and apparatus may include receiving, from a network entity, a transmission configuration indication including a DMRS pattern for configuring DMRS transmission on a communication channel. The method and apparatus further includes transmitting or receiving a DMRS to or from the network entity on the channel in accordance with the DMRS pattern. At a network entity, a method and apparatus may include transmitting, to a UE, a transmission configuration indication including a DMRS pattern for configuring DMRS transmission on a communication channel. The method and apparatus further includes transmitting or receiving a DMRS to or from the UE on the channel in accordance with the DMRS pattern.

28 Claims, 12 Drawing Sheets

(51) Int. Cl.
*H04W 24/02* (2009.01)
*H04L 1/18* (2006.01)

(56) References Cited

U.S. PATENT DOCUMENTS

| | | | | |
|---|---|---|---|---|
| 2012/0163335 | A1* | 6/2012 | Chung | H04L 5/0023 |
| | | | | 370/330 |
| 2012/0275415 | A1* | 11/2012 | Wang | H04L 1/0041 |
| | | | | 370/329 |
| 2014/0286255 | A1* | 9/2014 | Nam | H04L 1/1861 |
| | | | | 370/329 |
| 2014/0293900 | A1* | 10/2014 | Takeda | H04L 5/0073 |
| | | | | 370/329 |
| 2014/0302887 | A1* | 10/2014 | Bashar | H04W 4/70 |
| | | | | 455/550.1 |
| 2014/0362769 | A1* | 12/2014 | Chen | H04J 11/0053 |
| | | | | 370/328 |
| 2015/0155993 | A1* | 6/2015 | Berggren | H04L 5/0023 |
| | | | | 370/330 |
| 2015/0282123 | A1* | 10/2015 | Miao | H04W 48/00 |
| | | | | 455/450 |
| 2015/0282124 | A1* | 10/2015 | Miao | H04W 72/042 |
| | | | | 455/450 |
| 2016/0087774 | A1* | 3/2016 | Guo | H04L 5/0051 |
| | | | | 370/329 |
| 2016/0100398 | A1* | 4/2016 | Xia | H04W 72/0413 |
| | | | | 370/330 |
| 2016/0270059 | A1 | 9/2016 | Chen et al. | |
| 2017/0127414 | A1* | 5/2017 | Yi | H04L 27/2611 |

OTHER PUBLICATIONS

International Search Report and Written Opinion—PCT/US2017/048018—ISA/EPO—Oct. 13, 2017. 16 pages.
Samsung: "Transparency in DL Control Signalling for LTE-A MU-MIMO," 3GPP Draft; R1-101159, 3rd Generation Partnership Project (3GPP), Mobile Competence Centre; 650, Route Des Lucioles; F-06921 Sophia-Antipolis Cedex; France, vol. RAN WG1, No. San Francisco, USA; Feb. 16, 2010 (Feb. 16, 2010), 3 Pages, XP050418698, [retrieved on Feb. 16, 2010].

* cited by examiner

800

802

Receive, from a network entity, an uplink transmission configuration indication including a DMRS pattern for configuring DMRS transmission on an uplink communication channel, the DMRS pattern associated with one or more QoS characteristics

804

Transmit a DMRS to the network entity on the uplink communication channel in accordance with the DMRS pattern

FIG. 8

TECHNIQUES FOR DYNAMIC DEMODULATION REFERENCE SIGNAL PATTERNS FOR DATA TRANSMISSION

CROSS-REFERENCE TO RELATED APPLICATION(S)

This application claims the benefit of U.S. Provisional Application Ser. No. 62/401,658, entitled "TECHNIQUES FOR DYNAMIC DEMODULATION REFERENCE SIGNAL PATTERNS FOR DATA TRANSMISSION" and filed on Sep. 29, 2016, which is expressly incorporated by reference herein in its entirety.

BACKGROUND

Aspects of this disclosure relate generally to wireless communication networks, and more particularly to techniques for dynamic demodulation reference signal (DMRS) patterns for data transmissions in a wireless communication network.

Wireless communication networks are widely deployed to provide various telecommunication services such as telephony, video, data, messaging, and broadcasts. Typical wireless communication networks may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems.

These multiple access technologies have been adopted in various telecommunication standards to provide a common protocol that enables different wireless devices to communicate on a municipal, national, regional, and even global level. For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

As the number of packets being transmitted increases with 5G, techniques are needed to provide efficient and improved process when communicating DMRS during wireless communications. In certain instances, as the next generation of wireless communications come into existence, more flexible DMRS transmissions may be desired in order to ensure adequate or improved levels of wireless communications. Thus, improvements in DMRS communication during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method relates to demodulation reference signal (DMRS) transmission by a user equipment (UE). The method may include receiving, from a network entity, an uplink transmission configuration indication including a DMRS pattern for configuring DMRS transmission on an uplink communication channel, the DMRS pattern associated with one or more deployment characteristics. The method may further include transmitting a DMRS to the network entity on the uplink communication channel in accordance with the DMRS pattern.

In accordance with another aspect, an apparatus for DMRS transmission may include means for receiving, from a network entity, an uplink transmission configuration indication including a DMRS pattern for configuring DMRS transmission on an uplink communication channel, the DMRS pattern associated with one or more deployment characteristics. The apparatus may further include means for transmitting a DMRS to the network entity on the uplink communication channel in accordance with the DMRS pattern.

In accordance with another aspect, a computer-readable medium storing computer executable code for DMRS transmission may include code for receiving, from a network entity, an uplink transmission configuration indication including a DMRS pattern for configuring DMRS transmission on an uplink communication channel, the DMRS pattern associated with one or more deployment characteristics. The computer-readable medium may further include code for transmitting a DMRS to the network entity on the uplink communication channel in accordance with the DMRS pattern.

In accordance with yet another aspect, an apparatus for DMRS transmission may include a memory and a processor communicatively coupled to the memory. The processor may be configured to receive, from a network entity, an uplink transmission configuration indication including a DMRS pattern for configuring DMRS transmission on an uplink communication channel, the DMRS pattern associated with one or more quality of service (QoS) characteristics. The apparatus may further be configured to transmit a DMRS to the network entity on the uplink communication channel in accordance with the DMRS pattern.

In accordance with an aspect, a method relates to communication by a network entity. The method may include transmitting, to a UE, an uplink transmission configuration indication including a DMRS pattern for configuring DMRS transmission on an uplink communication channel, the DMRS pattern associated with one or more deployment characteristics. The described aspects further include receiving a DMRS from the UE on an uplink communication channel in accordance with the DMRS pattern.

In accordance with another aspect, an apparatus for communication at a network entity may include means for transmitting, to a UE, an uplink transmission configuration indication including a DMRS pattern for configuring DMRS transmission on an uplink communication channel, the DMRS pattern associated with one or more deployment characteristics. The apparatus may further include means for receiving a DMRS from the UE on an uplink communication channel in accordance with the DMRS pattern.

In accordance with another aspect, a computer-readable medium storing computer executable code for communication at a network entity may include code for transmitting, to a UE, an uplink transmission configuration indication including a DMRS pattern for configuring DMRS transmission on an uplink communication channel, the DMRS pattern associated with one or more deployment characteristics. The apparatus may further include receiving a DMRS from the UE on an uplink communication channel in accordance with the DMRS pattern.

In accordance with yet another aspect, an apparatus for communication at a network entity may include a memory and a processor communicatively coupled to the memory. The processor may be configured to transmit, to a user equipment (UE), an uplink transmission configuration indication including a DMRS pattern for configuring DMRS transmission on an uplink communication channel, the DMRS pattern associated with one or more deployment characteristics. The processor may further be configured to receive a DMRS from the UE on an uplink communication channel in accordance with the DMRS pattern.

In accordance with an aspect, a method relates to demodulation reference signal (DMRS) reception by a UE. The method may include receiving, from a network entity, a downlink transmission configuration indication including a DMRS pattern for configuring DMRS transmission on a downlink communication channel, the DMRS pattern associated with one or more deployment characteristics. The method may further include receiving a DMRS to the network entity on the downlink communication channel in accordance with the DMRS pattern.

In accordance with another aspect, an apparatus for DMRS reception may include means for receiving, from a network entity, a downlink transmission configuration indication including a DMRS pattern for configuring DMRS transmission on a downlink communication channel, the DMRS pattern associated with one or more deployment characteristics. The apparatus may further include means for receiving, from the network entity, a DMRS on the downlink communication channel in accordance with the DMRS pattern.

In accordance with another aspect, a computer-readable medium storing computer executable code for DMRS reception may include code for receiving, from a network entity, a downlink transmission configuration indication including a DMRS pattern for configuring DMRS transmission on a downlink communication channel, the DMRS pattern associated with one or more deployment characteristics. The computer-readable medium may further include code for receiving, from the network entity, a DMRS on the downlink communication channel in accordance with the DMRS pattern.

In accordance with yet another aspect, an apparatus for DMRS reception may include a memory and a processor communicatively coupled to the memory. The processor may be configured to receive, from a network entity, a downlink transmission configuration indication including a DMRS pattern for configuring DMRS transmission on a downlink communication channel, the DMRS pattern associated with one or more quality of service (QoS) characteristics. The apparatus may further be configured to receive, from the network entity, a DMRS on the downlink communication channel in accordance with the DMRS pattern.

In accordance with an aspect, a method relates to communication by a network entity. The method may include transmitting, to a UE, a downlink transmission configuration indication including a DMRS pattern for configuring DMRS transmission on a downlink communication channel, the DMRS pattern associated with one or more deployment characteristics. The described aspects further include transmitting a DMRS to the UE on the downlink communication channel in accordance with the DMRS pattern.

In accordance with another aspect, an apparatus for communication at a network entity may include means for transmitting, to a UE, a downlink transmission configuration indication including a DMRS pattern for configuring DMRS transmission on a downlink communication channel, the DMRS pattern associated with one or more deployment characteristics. The apparatus may further include means for transmitting a DMRS to the UE on a downlink communication channel in accordance with the DMRS pattern.

In accordance with another aspect, a computer-readable medium storing computer executable code for communication at a network entity may include code for transmitting, to a UE, a downlink transmission configuration indication including a DMRS pattern for configuring DMRS transmission on a downlink communication channel, the DMRS pattern associated with one or more deployment characteristics. The apparatus may further include transmitting a DMRS to the UE on the downlink communication channel in accordance with the DMRS pattern.

In accordance with yet another aspect, an apparatus for communication at a network entity may include a memory and a processor communicatively coupled to the memory. The processor may be configured to transmit, to a UE, a downlink transmission configuration indication including a DMRS pattern for configuring DMRS transmission on a downlink communication channel, the DMRS pattern associated with one or more deployment characteristics. The processor may further be configured to transmit a DMRS to the UE on the downlink communication channel in accordance with the DMRS pattern.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein:

FIG. 8 is a flow diagram illustrating an exemplary method of DMRS transmission in a wireless communication system in accordance with one or more exemplary aspects.

DETAILED DESCRIPTION

Figure 1A:
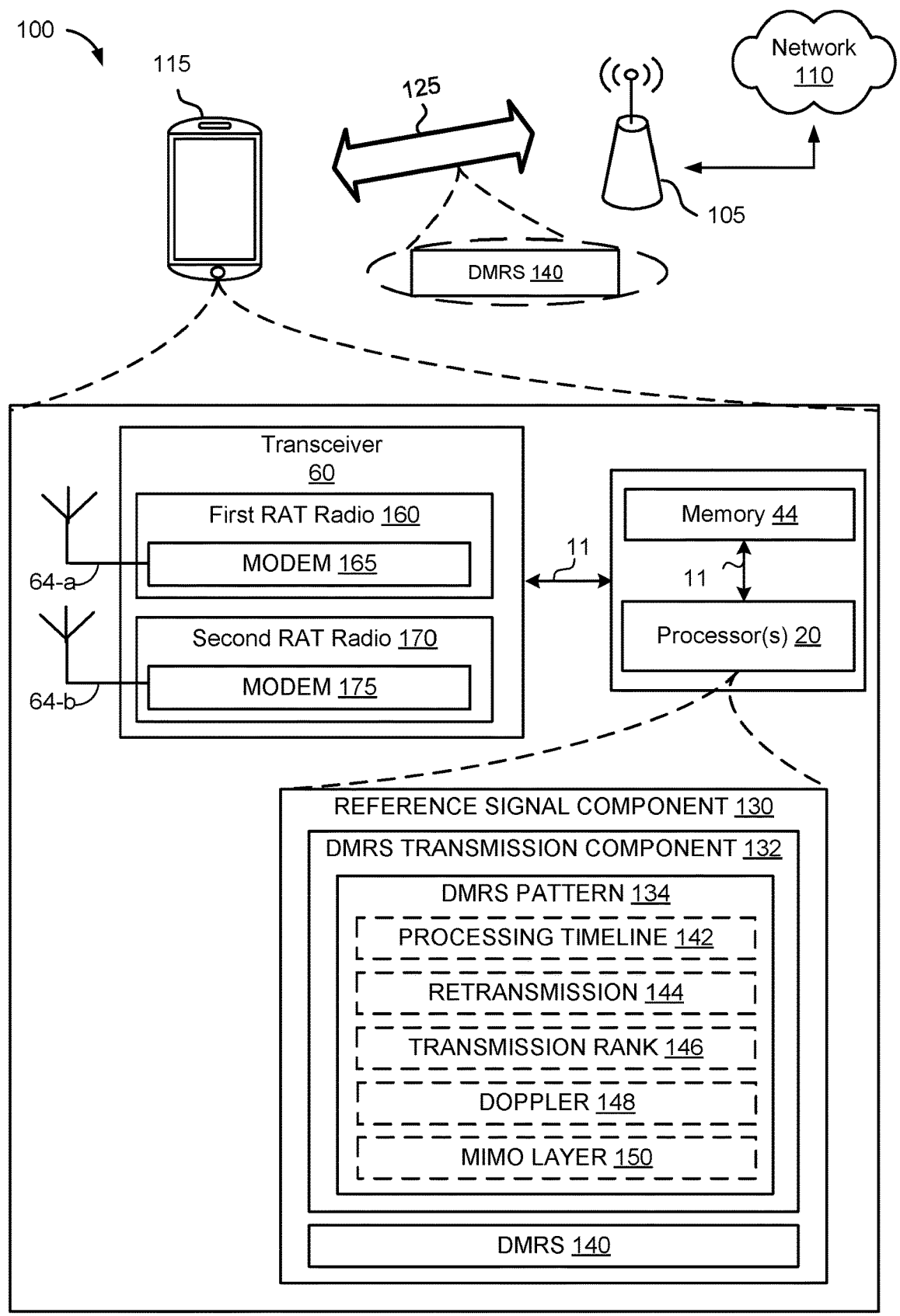
FIG. 1A is a schematic diagram of a wireless communication network including an aspect of a reference signal component for wireless communications in accordance with one or more exemplary aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to demodulation reference signal (DMRS) pattern determinations and DMRS transmissions in a wireless communication system. Specifically, DMRS may be a type of reference signals that provides modulation/demodulation information related to a communication channel (e.g., physical uplink control channel (PUCCH) and/or physical uplink shared channel (PUSCH)) to a network entity for accurate or coherent decoding of information transmitted via the communication channel. However, in some aspects, DMRS may be transmitted using a static DMRS pattern that may not take into account various deployment (e.g., quality of service (QoS)) parameters or characteristics that would otherwise affect DMRS transmission. Such deployment characteristics may include, but are not limited to a UE or network entity (e.g., evolved Node B) timeline parameter, a redundancy version (RV), HARQ process identifier (ID) (RV ID) associated with packet transmissions/retransmissions, a transmission rank associated with multi-input multi-output (MIMO) communication, one or more communication channel conditions, and/or one or more multi-user MIMO (MU-MIMO) layers.

In an example, for a MIMO UE, transmission of DMRS may be made according to a single DMRS pattern across multiple layers or streams, each of which may correspond to a number of UE antennas. However, transmission of DMRS on an uplink channel using multiple MIMO layers using the same DMRS pattern as in a single layer scheme may result in an inefficient transmission of the DMRS in conjunction with the uplink data. For example, transmission of the DMRS on two or more MIMO layers or streams using or according to a DMRS pattern used for a single layer may result in a suboptimal DMRS transmission to the network, especially in cases where the network provides or transmits a transmission rank to the UE. As such, it may be desirable for a network entity to determine and signal a distinct DMRS pattern to the UE for DMRS transmission according to the distinct DMRS pattern tailored to one or more specific deployment characteristics.

Accordingly, in some aspects, the present methods and apparatuses may provide an efficient solution, as compared to conventional solutions, by determining a distinct DMRS pattern at a network entity, and transmitting the DMRS pattern to a UE for DMRS transmission according to the distinct DMRS pattern. In other words, in the present aspects, a UE may efficiently and effectively transmit DMRS on an uplink channel according to a distinct DMRS pattern provided by the network entity. As such, the present aspects provide one or more mechanisms for receiving, from a network entity, a transmission configuration indication including a DMRS pattern for configuring DMRS transmission on a communication channel, the DMRS pattern associated with one or more deployment characteristics, and transmitting a DMRS to the network entity on the channel in accordance with the DMRS pattern. The present aspects provide one or more mechanisms for transmitting, to a UE, a transmission configuration indication including a DMRS pattern for configuring DMRS transmission on a communication channel, the DMRS pattern associated with one or more deployment characteristics, and receiving a DMRS from the UE on a channel in accordance with the DMRS pattern.

Figure 1B:
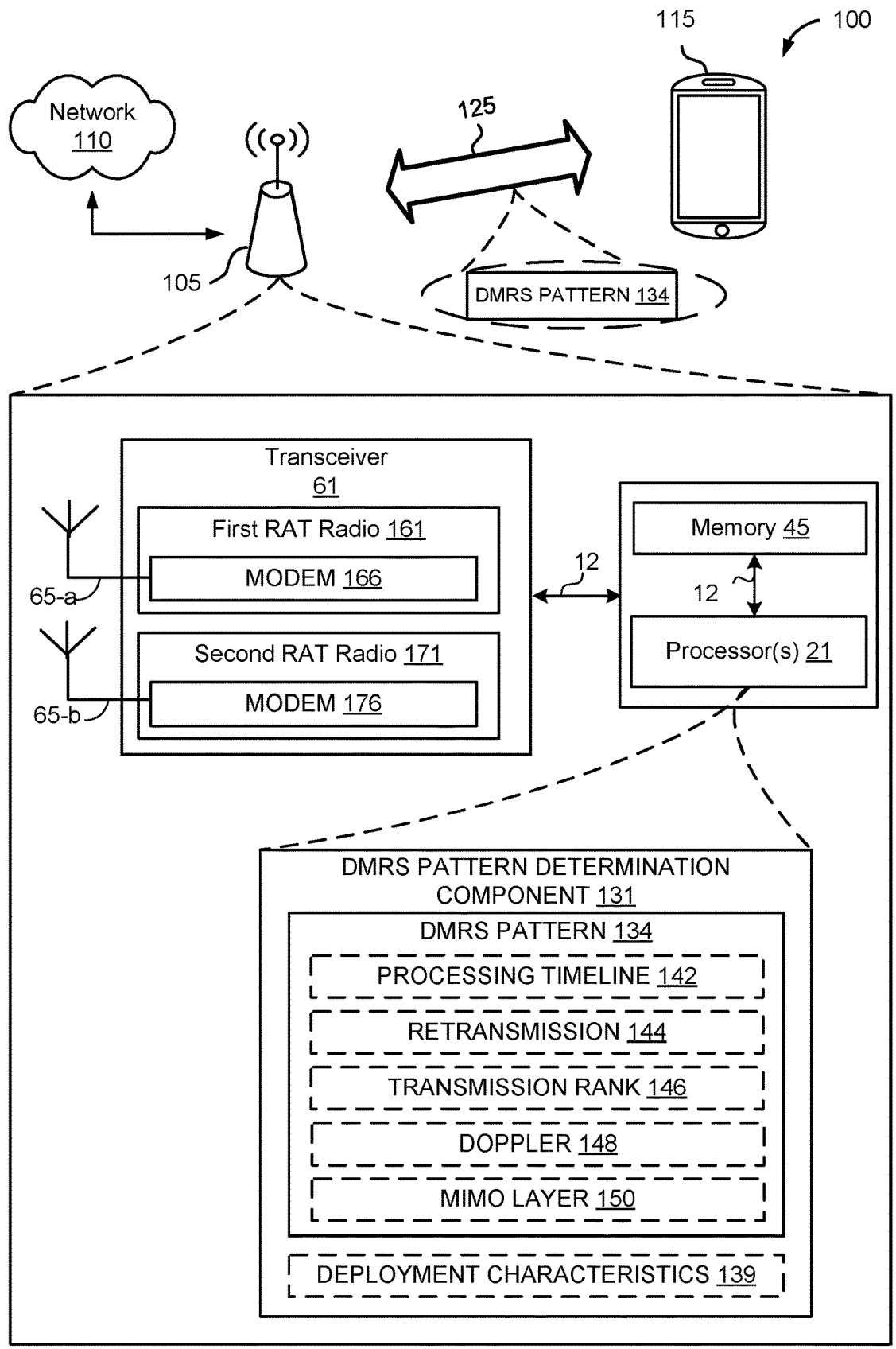
FIG. 1B is a schematic diagram of a wireless communication network including an aspect of a DMRS pattern determination component for wireless communications in accordance with one or more exemplary aspects.

Referring to FIGS. 1A and 1B, in an aspect, a wireless communication system 100 includes at least one user equipment (UE) 115 in communication coverage of at least network entities 105. The UE 115 may communicate with a network 110 via the network entity 105. In an example, the UE 115 may transmit and/or receive wireless communication to and/or from the network entity 105 via one or more communication channels 125. The one or more communication channels 125 may include an uplink communication channel (or simply uplink channel bandwidth region) for transmission of data from the UE 115 to the network entity 105 and a downlink communication channel (or simply downlink channel bandwidth region) for transmission of data from the network entity 105 to the UE 115, such as but not limited to an uplink data channel and/or downlink data channel. Such wireless communications may include, but are not limited to, data, audio and/or video information. Moreover, in an example, the wireless communications between the UE 115 and the network entity 105 may include 5G NR communications.

Referring to FIG. 1A, in accordance with the present disclosure, the UE 115 may include a memory 44, one or more processors 20 and a transceiver 60. The memory 44, one or more processors 20 and the transceiver 60 may communicate internally via a bus 11. In some examples, the memory 44 and the one or more processors 20 may be part of the same hardware component (e.g., may be part of a same board, module, or integrated circuit). Alternatively, the memory 44 and the one or more processors 20 may be separate components that may act in conjunction with one another. In some aspects, the bus 11 may be a communication system that transfers data between multiple components and subcomponents of the UE 115. In some examples, the one or more processors 20 may include any one or combination of modem processor, baseband processor, digital signal processor and/or transmit processor, or any other processor that may, for example, receive, from a network entity 105, an uplink and/or downlink transmission configuration indication including a DMRS pattern 134 for configuring DMRS 140 transmission on an uplink communication channel, the DMRS pattern 134 associated with one or more deployment (e.g., QoS) characteristics, and transmit a DMRS 140 to the network entity 206 on the uplink channel in accordance with the DMRS pattern 134.

Additionally or alternatively, the one or more processors 20 may include a reference signal component 130 for carrying out one or more methods or procedures described herein. In an aspect, the term "component" as used herein may be one of the parts that make up a system, may be hardware, firmware, and/or software, and may be divided into other components. The reference signal component 130, and each of its subcomponents, may comprise hardware, firmware, and/or software and may be configured to execute code or perform instructions stored in a memory (e.g., a computer-readable storage medium).

In some examples, the UE 115 may include the memory 44, such as for storing data used herein and/or local versions of applications or communication with reference signal component 130 and/or one or more of its subcomponents being executed by the one or more processors 20. The memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, the memory 44 may be a computer-readable storage medium (e.g., a non-transitory medium) that stores one or more computer-executable codes defining the reference signal component 130 and/or one or more of its subcomponents, and/or data associated therewith, when the UE 115 is operating one or more processors 20 to execute the reference signal component 130 and/or one or more of its subcomponents. In some examples, the UE 115 may further include a transceiver 60 for transmitting and/or receiving one or more data and control signals to/from the network via the network entity 105. The transceiver 60 may comprise hardware, firmware, and/or software and may be configured to execute code or perform instructions stored in a memory (e.g., a computer-readable storage medium). The transceiver 60 may include a first radio access technology (RAT) radio 160 (e.g. UMTS/WCDMA, LTE-A, WLAN, Bluetooth, WSAN-FA) comprising a modem 165, and a second RAT radio 170 (e.g., 5G) comprising a modem 175. The first RAT radio 160 and second RAT radio 170 may utilize one or more antennas 64 for transmitting signals to and receiving signals from the network entity 105. In some examples, the transceiver 60 may include one of the first RAT radio 160 or the second RAT radio 170.

For example, the UE 115 may include the reference signal component 130, which may be configured to facilitate transmission of the DMRS 140 according to a dynamic DMRS pattern 134 on an uplink channel and/or reception of the DMRS 140 according to the DMRS pattern 134 on a downlink channel. In some aspects, the uplink channel on which the DMRS 140 is transmitted may be or otherwise correspond to PUSCH or PUCCH. Further, the DMRS 140 transmission may be for a short uplink transmission on PUSCH, which may include one or more symbols and/or two or more half-symbols. For instance, the UE 115 may initially receive an uplink transmission configuration indication including a distinct DMRS pattern 134 for configuring the DMRS 140 transmission on an uplink channel from the network entity 105.

Specifically, the distinct DMRS pattern 134 received from the network entity 105 may tailor DMRS transmission to one or more deployment parameters or characteristics. For example, in some aspects, the transmission of DMRS 140 on an uplink channel may be static for various deployment (e.g., QoS) scenarios such that a limited number of DMRS patterns 134 can be implemented. As such, such DMRS transmission based on a static DMRS pattern 134 may result in inefficient or poor DMRS transmission. Accordingly, a dynamic approach to the DMRS 140 transmission such that a DMRS pattern 134 may be adapted to a particular deployment characteristic and may provide an improved DMRS 140 transmission.

For example, the reference signal component 130 may be configured to receive the DMRS pattern 134 from the network entity 105 for DMRS 140 transmission using the DMRS transmission component 132. The DMRS pattern 134 may configure the DMRS 140 transmission in accordance with one or more deployment characteristics including, but not limited to, a UE or network entity processing timeline 142 parameter or characteristic, an RV ID associated with packet transmissions/retransmissions 144, a transmission rank 146 associated with multi-input multi-output (MIMO) communication, one or more communication channel conditions such as a Doppler 148, and/or one or more multi-user MIMO (MU-MIMO) layers 150.

In some aspects, the UE or network entity processing timeline 142 parameter or characteristic may be or otherwise correspond to a transmission timeline for each of the downlink and uplink partitioned into units of radio frames, where each radio frame may have a predetermined duration and a number of subframes. Further, the RV ID associated with the packet transmissions/retransmissions 144 may be or otherwise correspond to synchronous or asynchronous HARQ transmission on the downlink such that the RV ID are sent along with data to the UE. In some aspects, RV may specify which combination of data, error-detecting (ED), and forward error correction (FEC) bits is being sent to the UE.

In some aspects, the transmission rank 146 may be or otherwise correspond to a number of layers or streams (e.g., MIMO layers/streams) on which the UE 115 may simultaneously transmit and/or receive information. In some aspects, the one or more communication channel conditions may include Doppler levels 148 and/or delay spreads associated with a particular channel (e.g., PUSCH). In some aspects, the one or more MU-MIMO layers 150 may be one or more data streams to be transmitted over particular time/frequency resources. Transmissions with multiple layers may transmit more than one data stream over the same time/frequency resources.

Each of the foregoing deployment characteristics are further described herein with respect to FIGS. 2-7.

The UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. The UE 115 may be able to communicate with macro eNodeBs, small cell eNodeBs, relays, and the like. The UE 115 may also be able to communicate over different access networks, such as cellular or other WWAN access networks, or WLAN access networks.

Additionally, as used herein, the one or more wireless nodes or wireless serving nodes, including, but not limited to, the network entity 105 of wireless communication system 100, may include one or more of any type of network component, such as an access point, including a base station or node B, an eNodeB a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more macro and/or small cell base stations, such as, but not limited to a femtocell, picocell, microcell, or any other base station having a relatively small transmit power or relatively small coverage area as compared to a macro base station.

Referring to FIG. 1B, in accordance with the present disclosure, the network entity 105 may include a memory 45, one or more processors 21 and a transceiver 61. The memory 45, one or more processors 21 and the transceiver 61 may communicate internally via a bus 12. In some examples, the memory 45 and the one or more processors 21 may be part of the same hardware component (e.g., may be part of a same board, module, or integrated circuit). Alternatively, the memory 45 and the one or more processors 21 may be separate components that may act in conjunction with one another. In some aspects, the bus 12 may be a communication system that transfers data between multiple components and subcomponents of the network entity 105. In some examples, the one or more processors 21 may include any one or a combination of modem processor, baseband processor, digital signal processor and/or transmit processor, or any other processor that may, for example, transmit, to a UE 115, a transmission configuration indication including a DMRS pattern 134 for configuring a DMRS 140 transmission on an uplink communication channel, the DMRS pattern 134 associated with one or more deployment characteristics 139, and receiving a DMRS 140 from the UE 115 on an uplink channel in accordance with the DMRS pattern 134.

Additionally or alternatively, the one or more processors 21 may include a DMRS pattern determination component 131 for carrying out one or more methods or procedures described herein. In an aspect, the term "component" as used herein may be one of the parts that make up a system, may be hardware, firmware, and/or software, and may be divided into other components. The DMRS pattern determination component 131, and each subcomponent, may comprise hardware, firmware, and/or software and may be configured to execute code or perform instructions stored in a memory (e.g., a computer-readable storage medium).

In some examples, the network entity 105 may include the memory 45, such as for storing data used herein and/or local versions of applications or communication with the DMRS pattern determination component 131 and/or one or more subcomponents being executed by the one or more processors 21. The memory 45 can include any type of computer-readable medium usable by a computer or processor 21, such as random access memory (RAM), read only memory (ROM), tapes, magnetic discs, optical discs, volatile memory, non-volatile memory, and any combination thereof. In an aspect, for example, the memory 45 may be a computer-readable storage medium (e.g., a non-transitory medium) that stores one or more computer-executable codes defining the DMRS pattern determination component 131 and/or one or more of its subcomponents, and/or data associated therewith, when the network entity 105 is operating one or more processors 21 to execute the transmission rank determination component 131 and/or one or more subcomponents. In some examples, the network entity 105 may further include a transceiver 61 for transmitting and/or receiving one or more data and control signals to/from the UE 115. The transceiver 61 may comprise hardware, firmware, and/or software and may be configured to execute code or perform instructions stored in a memory (e.g., a computer-readable storage medium). The transceiver 61 may include a first radio access technology (RAT) radio 161 (e.g. UMTS/WCDMA, LTE-A, WLAN, Bluetooth, WSAN-FA) comprising a modem 166, and a second RAT radio 171 (e.g., 5G) comprising a modem 176. The first RAT radio 161 and second RAT radio 171 may utilize one or more antennas 65 for transmitting signals to and receiving signals from the UE 115. In some examples, the transceiver 61 may include one of the first RAT radio 161 or the second RAT radio 171.

For example, the network entity 105 may include the DMRS pattern determination component 131, which may be configured to detecting the one or more deployment characteristics 139 associated with the DMRS 140 transmission, and determine the DMRS pattern 134 based at least on the one or more detected deployment characteristics 139. For example, the one or more deployment characteristics 139 may include, but are not limited to, a UE or network entity processing timeline parameter 142 or characteristic, an RV ID associated with the packet transmissions 144 or retransmissions, a transmission rank 146 associated with multi-input multi-output (MIMO) communication, one or more communication channel conditions such as Doppler 148, and/or one or more multi-user MIMO (MU-MIMO) layers 150. Accordingly, the DMRS pattern determination component 131 may facilitate a dynamic approach to the DMRS 140 transmission such that a DMRS pattern 134 adapted to a particular deployment characteristic may be determined. In some aspects, the network entity 105 may be configured to transmit, on an uplink channel, the DMRS 140 to the UE 115 in accordance with the DMRS pattern 134. Further, in some aspects, the network entity 105 may be configured to receive, on a downlink communication channel, the DMRS 140 to the UE 115 in accordance with the DMRS pattern 134. Each of the foregoing deployment characteristics are further described herein with respect to FIGS. 2-7.

Figure 2:
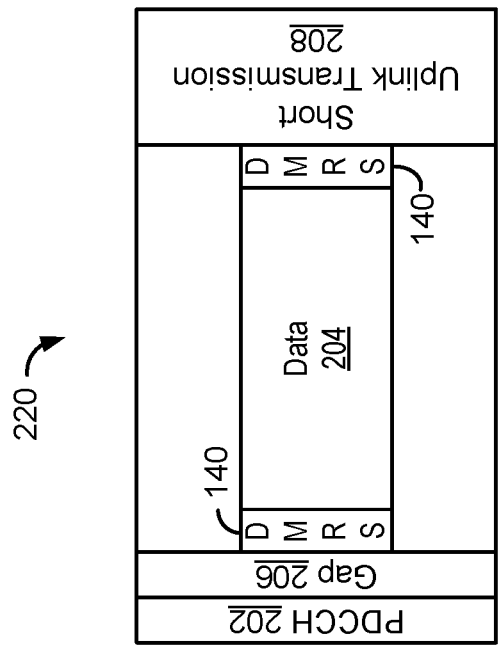
FIG. 2 is a conceptual diagram of various transmission schemes including timeline-dependent DMRS patterns in accordance with one or more exemplary aspects.
Figure 2:
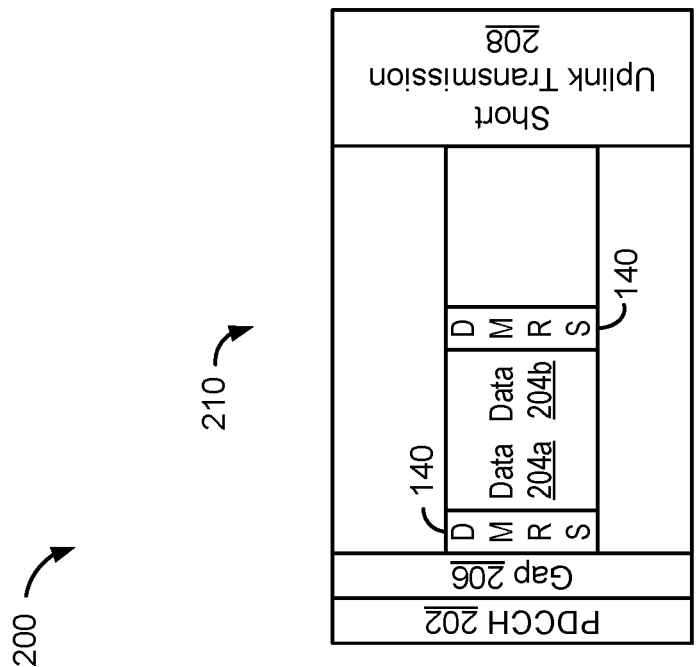

FIG. 2 illustrates a conceptual diagram 200 of various transmission schemes related to processing timeline 142 based DMRS pattern 134 including a first timeline-dependent DMRS pattern 210 and a second timeline-dependent DMRS pattern 220 in accordance with one or more exemplary aspects. For example, as part of the first timeline-dependent DMRS pattern 210, data transmitted on a physical downlink control channel (PDCCH) 202 may be followed by or otherwise adjacent to a gap 206. Between the gap 206 and a short uplink transmission 208, the first timeline-dependent DMRS pattern 210 may include a tight timeline, such that a single HARQ interlace structure is used in transmitting DMRS 140 and data 204a and 204b. In some aspects, a HARQ interlace structure may include a timing relationship between different transmissions of the same data packet (e.g., MAC packet) and of the acknowledgements, ACK or NACK, for these transmissions. As such, the first timeline-dependent DMRS pattern 210 may use a front pilot symbol and a middle pilot symbol for DMRS 140 transmission. Further, the second timeline-dependent DMRS pattern 220 may include a similar structure to the first timeline-dependent DMRS pattern 210, except for the two HARQ interlace structure for the DMRS 140 and data 204 transmission. As such, the second timeline-dependent DMRS pattern 220 may use the front pilot symbol and the back or end pilot symbol for the DMRS 140 transmission.

The short uplink transmission 208 may include one or more symbols and/or two or more half-symbols. The short uplink transmission 208 may include, but is not limited to PUCCH data, which in turn may include one or more of acknowledgment (ACK) indications, a channel quality indicator (CQI), a pre-coding matrix indicator (PMI), a rank indicator (RI), a scheduling request (SR), and/or PUSCH data. In the second communication scheme 220, PDCCH 202 may be followed by a gap 206. The data 204 may be transmitted followed by the short uplink transmission 208. In some aspects, the uplink regular burst 204 may include similar data as the short uplink transmission 208 (e.g., PUCCH and PUSCH) in addition to Rnn.

In some aspects, an ACK indication may be or otherwise correspond to a signal or indication sent by a receiving device (e.g., UE 115) to a sending device (e.g., network entity 105) after successfully receiving a packet data unit. In some aspects, CQI may indicate a quality or condition of a particular channel (e.g., an uplink/downlink channel) based on one or more measurements taken or made by the UE 115. In some aspects, PMI may indicate the precoding matrix used for downlink transmission. In some aspects, a RI indicates the number of layers/streams (e.g., corresponding to the number of antennas of the UE 115) used for communication. In some aspects, the SR requests that the network entity 105 send an UL grant (e.g., DCI Format 0) such that the UE 115 may transmit PUSCH.

Figure 3:
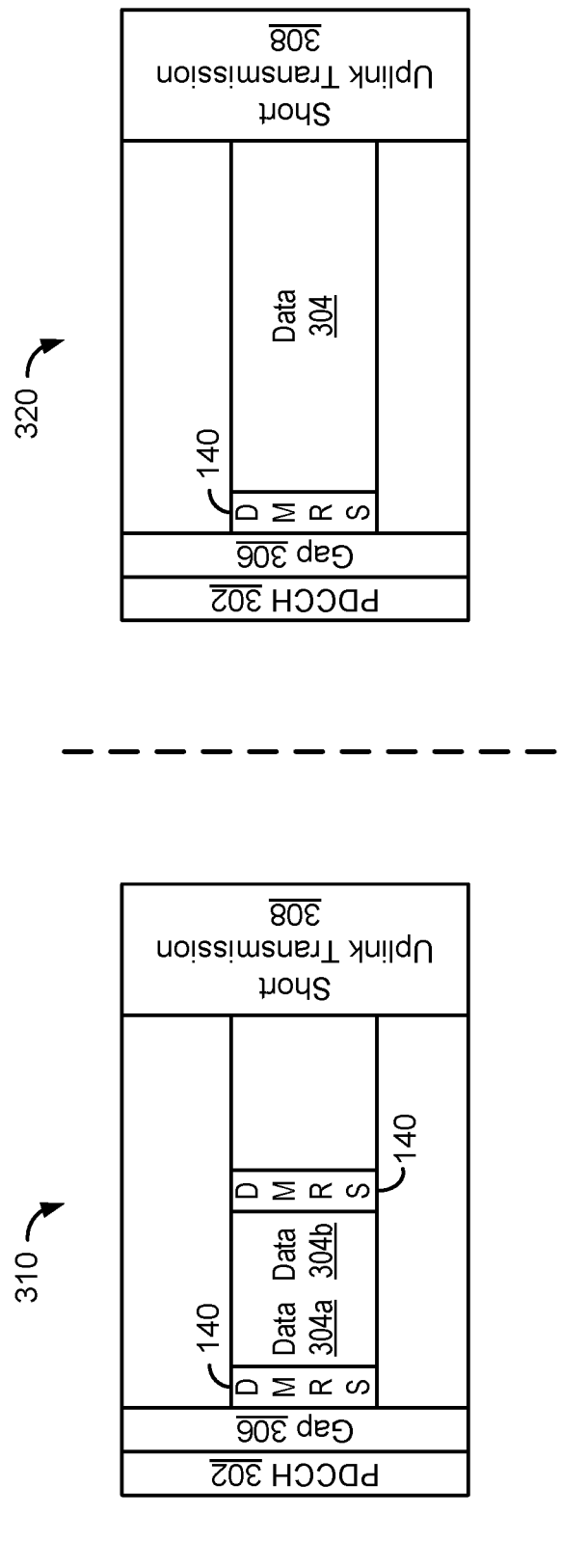
FIG. 3 is a conceptual diagram of various transmission schemes including redundancy version (RV), HARQ process identifier (ID) DMRS patterns in accordance with one or more exemplary aspects.

FIG. 3 is a conceptual diagram 300 of various transmission schemes including retransmission 144 dependent DMRS patterns in accordance with one or more exemplary aspects. For example, a first DMRS pattern 310 and a second DMRS pattern 320 may be used for DMRS 140 transmission according to different RV ID scenarios. In particular, the first DMRS pattern 310 may be used for a new transmission such that data transmitted on a PDCCH 302 may be followed by or otherwise adjacent to a gap 306. Further, data 304a and 304b may be transmitted along with the DMRS 140 in accordance with an RV ID dependent DMRS pattern. The first DMRS pattern 310 may also include a short uplink transmission 308. The second DMRS pattern 320 may include a similar structure to the first DMRS pattern 310 in terms of the PDCCH 302, gap 306, and the short uplink transmission 308. However, the DMRS 140 transmission may be structured differently from the first DMRS pattern 310 and in accordance with a different RV ID scenario, for example, having a DMRS 140 symbol position at a front pilot followed by data 304.

Figure 4:
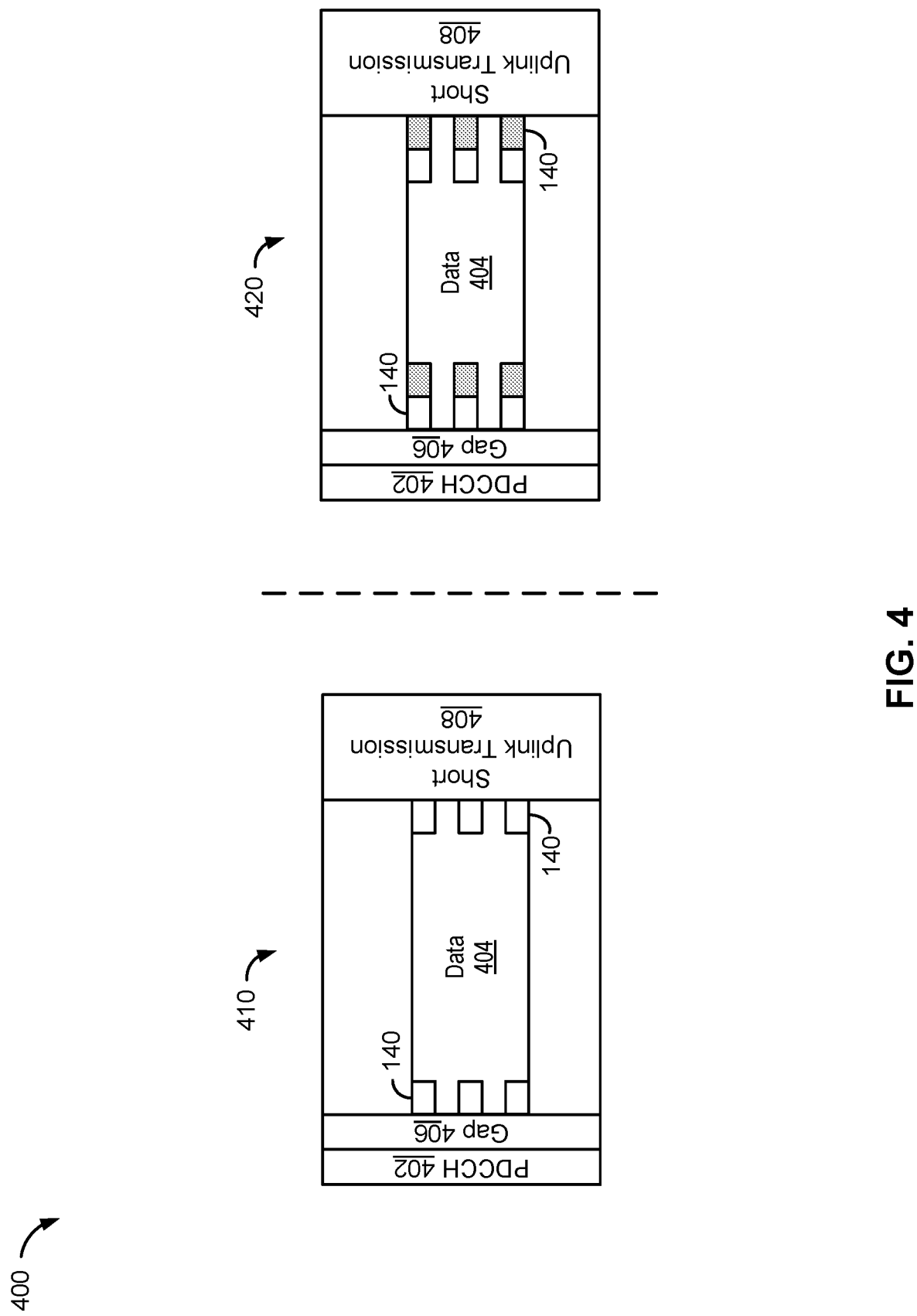
FIG. 4 is a conceptual diagram of various transmission schemes including rank-dependent DMRS patterns in accordance with one or more exemplary aspects.

FIG. 4 is a conceptual diagram 400 of various transmission schemes including transmission rank 146 dependent DMRS patterns in accordance with one or more exemplary aspects. For instance, a first rank-dependent DMRS pattern 410 and a second rank-dependent DMRS pattern 420 may be used for transmitting DMRS 140 in accordance with different transmission ranks. Specifically, data transmissions with different transmission ranks can apply different DMRS patterns. The first rank-dependent DMRS pattern 410 may be used for a first transmission rank (e.g., rank '1') such that data transmitted on a PDCCH 402 may be followed by or otherwise adjacent to a gap 406. Further, data 404 may be transmitted along with the DMRS 140, for example, in accordance with a comb pattern corresponding to a particular layer (e.g., rank '1'=layer 1). The first rank-dependent DMRS pattern 410 may also include a short uplink transmission 408. The second rank-dependent DMRS pattern 420 may include a similar structure to the first rank-dependent DMRS pattern 410 in terms of the PDCCH 402, gap 406, and the short uplink transmission 408. However, the DMRS 140 transmission may be structured differently from the first rank-dependent DMRS pattern 310 and in accordance with a different transmission rank. For example, the transmission rank for the second rank-dependent DMRS pattern 420 may correspond to rank '2' such that a comb pattern corresponding to a dual layer scheme is used in DMRS 140 transmission.

In some aspects, the transmission rank may be greater than or equal to rank '1', and in some aspects, may corresponds to at least one of rank '1', rank '2', or rank '4'. Accordingly, each transmission rank may be associated with or otherwise trigger a distinct DMRS pattern for the DMRS 140 transmission on the single layer/stream in the case of rank '1', or on the various MIMO layers/streams for transmission ranks greater than rank '1'.

Figure 5:
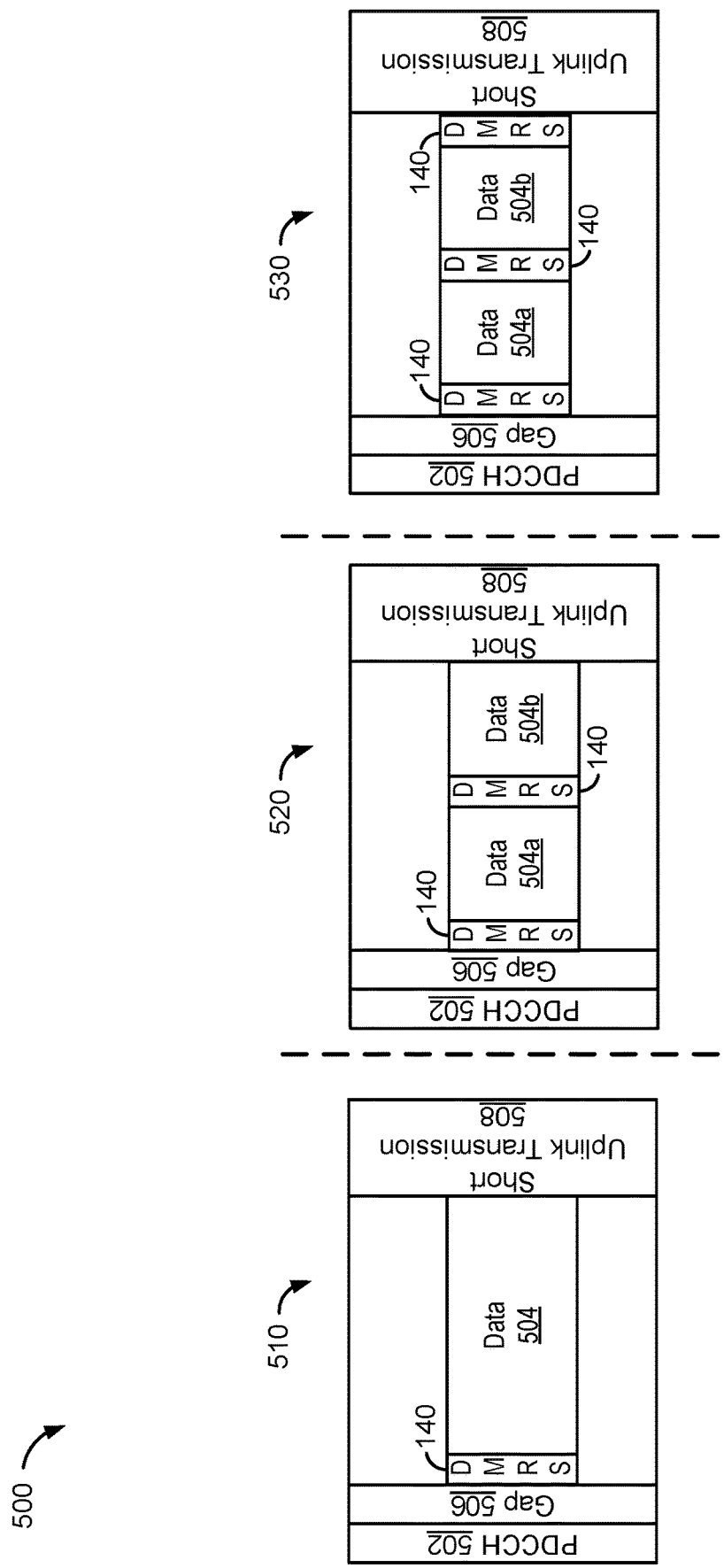
FIG. 5 is a conceptual diagram of various transmission schemes including channel condition dependent DMRS patterns in accordance with one or more exemplary aspects.

FIG. 5 is a conceptual diagram 500 of various transmission schemes including channel condition dependent DMRS patterns (e.g., Doppler 148) in accordance with one or more exemplary aspects. For instance, a first DMRS pattern 510, a second DMRS pattern 520, and a third DMRS pattern 530 may each be tailored to a particular channel condition scenario. Specifically, the first DMRS pattern 510 may correspond to a first (low) Doppler level, the second DMRS pattern 520 may correspond to a second (medium) Doppler level higher than the first Doppler level, and the third DMRS pattern 530 may correspond to a third (high) Doppler level higher than the first and second Doppler levels. Each of the first, second, and third DMRS patterns 510, 520, and 530 may include a PDCCH 502, a gap 506, and a short uplink transmission 508. However, each of the first, second, and third DMRS patterns 510, 520, and 530 may include a distinct DMRS scheme such that an increase in the Doppler level corresponds to an increase in a number of DMRS 140 in a given timeslot. For example, the first DMRS pattern 510 may include a single DMRS 140 transmission per slot, the second DMRS pattern 520 may include two DMRS 140 transmissions per slot, and the third DMRS pattern 530 may include three DMRS 140 transmission per slot.

Figure 6:
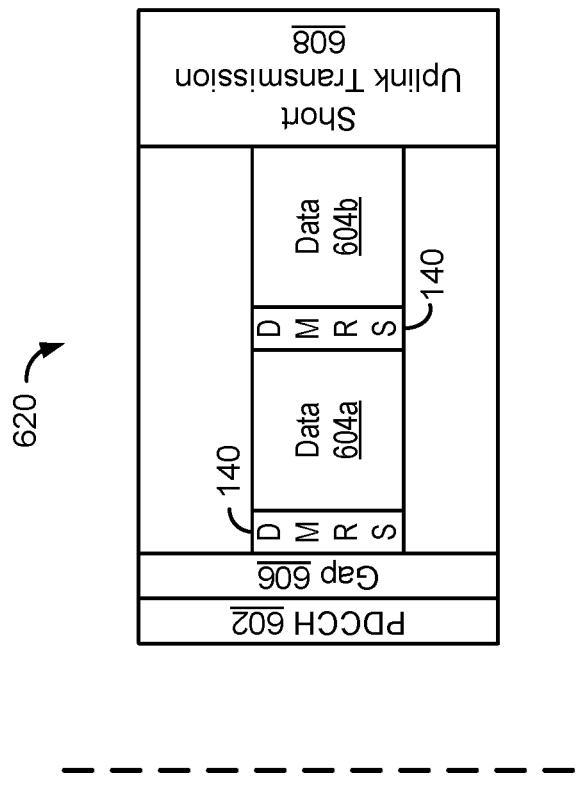
FIG. 6 is a conceptual diagram of various transmission schemes including multi-user multiple-input multiple-output (MU-MIMO) layer-dependent DMRS patterns in accordance with one or more exemplary aspects.
Figure 6:
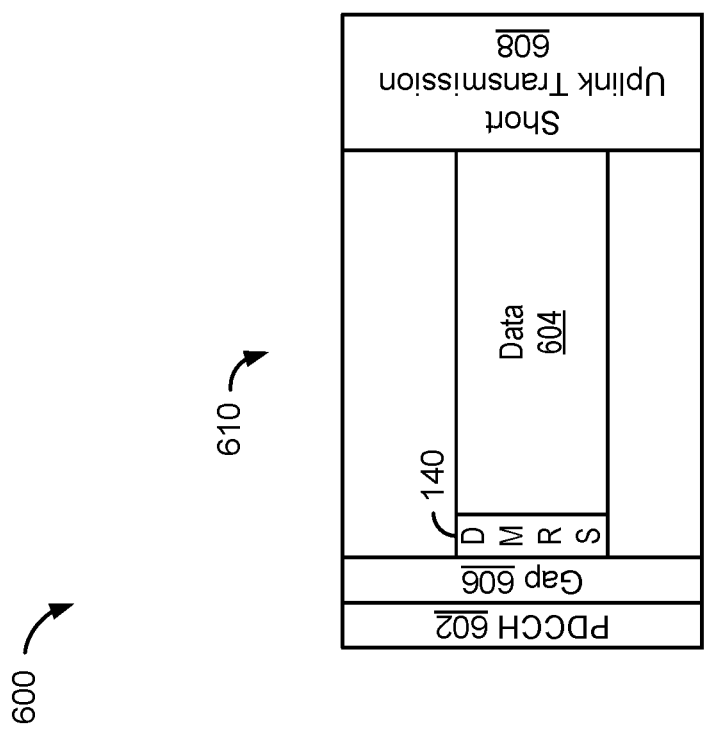

FIG. 6 is a conceptual diagram 600 of various transmission schemes including MU-MIMO layer 150 dependent DMRS patterns in accordance with one or more exemplary aspects. Specifically, different MU-MIMO layers may correspond to different DMRS patterns. For example, a first MU-MIMO DMRS pattern 610 and a second MU-MIMO pattern 620 may each be tailored to a particular MU-MIMO layer, e.g., MU-MIMO layer '0' in the case of the first MU-MIMO DMRS pattern 610 and MU-MIMO layer '1' in the case of the second MU-MIMO pattern 620. Each of the first and second MU-MIMO DMRS patterns 610 and 620 may include a PDCCH 602, a gap 606, and a short uplink transmission 608. However, as illustrated, the DMRS symbol position may be distinct based on the MU-MIMO layer for each of the first and second MU-MIMO DMRS patterns 610 and 620.

Figure 7:
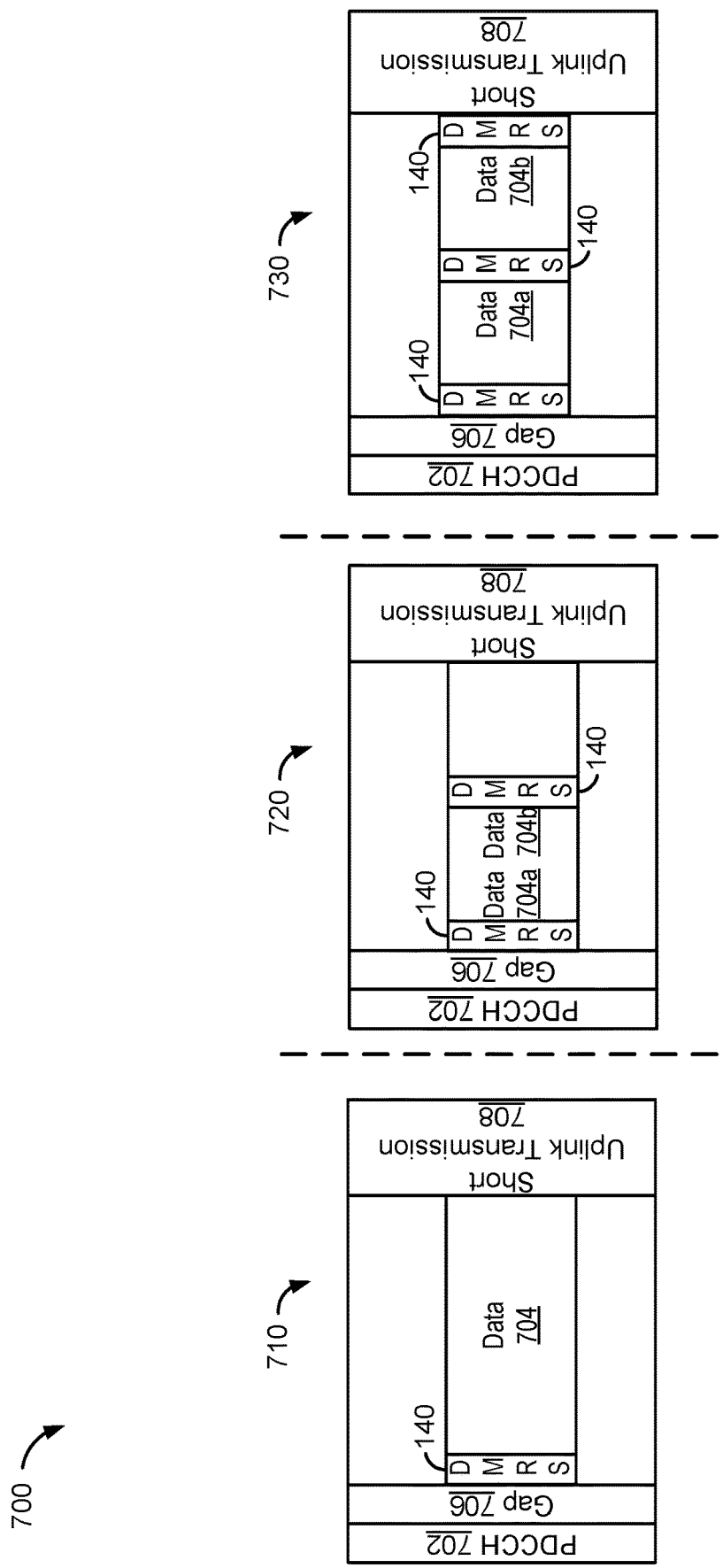
FIG. 7 is a conceptual diagram of various transmission schemes including nested DMRS patterns in accordance with one or more exemplary aspects.

FIG. 7 is a conceptual diagram 700 of various transmission schemes including nested DMRS patterns in accordance with one or more exemplary aspects. For example, a first nested DMRS pattern 710, a second nested DMRS pattern 720, and a third nested DMRS pattern 730 as applied to the Doppler level QoS characteristic may be used in transmitting DMRS 140. Specifically, a nested or partially overlapped DMRS pattern allows multiplexing of different DMRS patterns in the same transmission resources. Each of the first, second, and third nested DMRS patterns 710, 720, and 730 may include a PDCCH 702, a gap 706, and a short uplink transmission 708. However, each of the first, second, and third DMRS nested patterns 710, 720, and 730 may include a distinct DMRS scheme such that a nested or partially overlapped DMRS 140 may be multiplexed with various DMRS patterns.

FIG. 8 is a flow diagram illustrating examples of a method 800 related to DMRS transmission in accordance with various aspects of the present disclosure. Although the operations described below are presented in a particular order and/or as being performed by an example component, the ordering of the actions and the components performing the actions may be varied, depending on the implementation. Also, although the reference signal component 130 (FIG. 1A) is illustrated as having a number of subcomponents, it should be understood that one or more of the illustrated subcomponents may be separate from, but in communication with, the reference signal component 130, and/or each other. Moreover, any of actions or components described below with respect to the reference signal component 130 and/or any subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

In an aspect, at block 802, the method 800 may receive, from a network entity, an uplink transmission configuration indication including a DMRS pattern for configuring DMRS transmission on an uplink communication channel, the DMRS pattern associated with one or more deployment characteristics. In an aspect, for example, the UE 115 (FIG. 1A) may execute the reference signal component 130 (FIG. 1A) and/or the transceiver 60 (FIG. 1A) to receive, from a network entity 105 (FIG. 1A), an uplink transmission configuration indication including a DMRS pattern 134 (FIG. 1A) for configuring DMRS transmission on an uplink communication channel, the DMRS pattern 134 associated with one or more deployment characteristics.

In some aspects, the DMRS pattern 134 may correspond to at least one of a first timeline-dependent DMRS pattern having one HARQ interlace or a second timeline-dependent DMRS pattern having two or more HARQ interlaces. Further, in some aspects, the first timeline-dependent DMRS pattern includes a front pilot symbol and a middle pilot symbol for DMRS transmission and the second timeline-dependent DMRS pattern includes a front pilot symbol and an end pilot symbol for DMRS transmission. Moreover, in some aspects, a symbol position of the DMRS 140 may be based on a number of HARQ interlaces. Additionally, in some aspects, the one or more deployment characteristics correspond to a communication timeline of the UE.

In some aspects, the DMRS pattern 134 may correspond to at least one of a transmission DMRS pattern including a first DMRS symbol arrangement or a retransmission DMRS pattern including a second DMRS symbol arrangement. Further, in some aspects, the first DMRS symbol arrangement may include a front pilot symbol and a middle pilot symbol for DMRS transmission and the second DMRS symbol arrangement includes a front pilot symbol for DMRS transmission. In addition, in some aspects, the one or more deployment characteristics may correspond to a redundancy version (RV), HARQ process identifier (ID) for the UE 115.

In some aspects, the uplink transmission configuration indication may further include a transmission rank greater than or equal to rank '1', such that the DMRS pattern 134 corresponds to a distinct DMRS pattern based on the transmission rank. Further, in some aspects, the transmission rank may correspond to at least one of rank '1', rank '2', or rank '4'. Additionally, the one or more deployment characteristics may correspond to the transmission rank.

In some aspects, the DMRS pattern 134 may correspond to a distinct DMRS pattern associated with at least one of a Doppler level or a delay spread. Further, in some aspects, the distinct DMRS pattern includes at least one of a first DMRS pattern associated with a low Doppler level and including at least one DMRS symbol position, a second DMRS pattern associated with a medium Doppler level and including at least two DMRS symbol positions, or a third DMRS pattern associated with a high Doppler level and including at least three DMRS symbol positions. Moreover, in some aspects, the one or more deployment characteristics correspond to a communication channel condition.

In some aspects, the DMRS pattern 134 may correspond to a distinct DMRS pattern associated with a respective MU-MIMO layer. Further, in some aspects, the distinct DMRS pattern may include at least one of a first multi-user DMRS pattern associated with a first layer and including at least one DMRS symbol position, or a second multi-user DMRS pattern associated with a second layer and including at least two DMRS symbol positions. Moreover, in some aspects, the one or more deployment characteristics correspond to one or more MU-MIMO layers.

In some aspects, the DMRS pattern 134 may include a nested DMRS pattern for multiplexing of distinct DMRS patterns in one or more transmission resources. In some aspects, the uplink transmission configuration indication may be received via RRC signaling from the network entity 105. In some aspects, the uplink transmission configuration indication may be received on a downlink control channel from the network entity 105. Further, in some aspects, the uplink communication channel may correspond to a PUSCH.

At block 804, the method 800 may transmit a DMRS to the network entity on the uplink channel in accordance with the DMRS pattern. In an aspect, for example, the UE 115 (FIG. 1A) may execute the reference signal component 130 (FIG. 1A) and/or DMRS transmission component 132 to transmit a DMRS 140 (FIG. 1A) to the network entity 105 on the uplink channel in accordance with the DMRS pattern 134.

Figure 9:
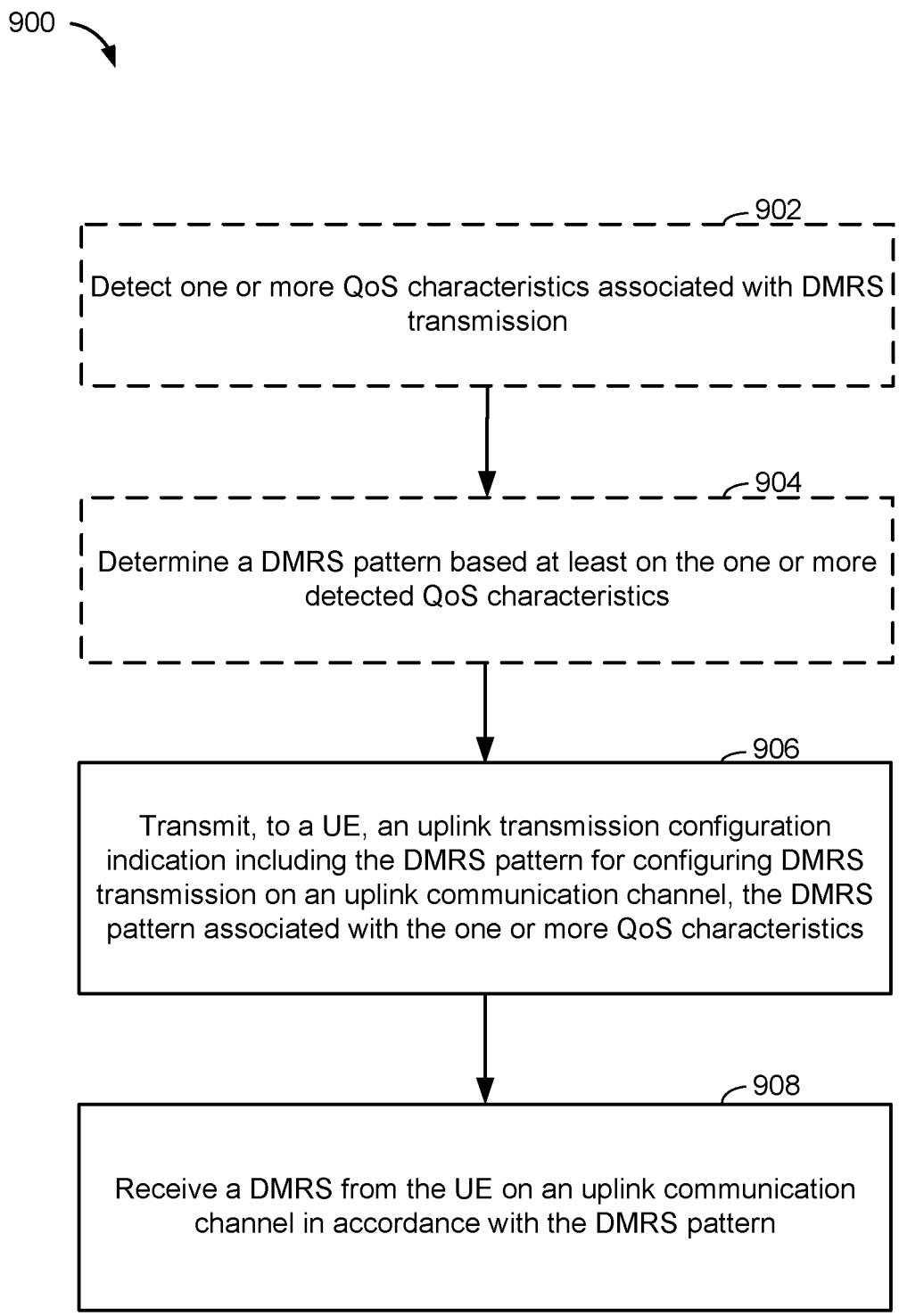
FIG. 9 is a flow diagram illustrating an exemplary method of communication at a network entity in accordance with one or more exemplary aspects.

FIG. 9 is a flow diagram illustrating examples of a method 900 related to communication by a network entity in accordance with aspects of the present disclosure. Although the operations described below are presented in a particular order and/or as being performed by an example component, it should be understood that the ordering of the actions and the components performing the actions may be varied, depending on the implementation. Also, although the DMRS pattern determination component 131 (FIG. 1B) is illustrated as having a number of subcomponents, it should be understood that one or more of the illustrated subcomponents may be separate from, but in communication with, the DMRS pattern determination component 131, and/or each other. Moreover, it should be understood that any of actions or components described below with respect to the DMRS pattern determination component 131 and/or its subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

At block 902, the method 900 may optionally detect one or more deployment characteristics associated with DMRS transmission. In an aspect, for example, the network entity 105 (FIG. 1B) and/or DMRS pattern determination component 131 (FIG. 1B) may detect one or more deployment characteristics associated with DMRS transmission. In some aspects, the one or more deployment characteristics may be measurement information received from the UE 115 (FIG. 1B) or detected by the network entity 105.

Further, at block 904, the method 900 may optionally determine a DMRS pattern based at least on the one or more detected deployment characteristics. In an aspect, for example, the network entity 105 (FIG. 1B) and/or DMRS pattern determination component 131 (FIG. 1B) may determine a DMRS pattern based at least on the one or more detected deployment characteristics.

In some aspects, the DMRS pattern 134 may correspond to at least one of a first timeline-dependent DMRS pattern having one HARQ interlace or a second timeline-dependent DMRS pattern having two or more HARQ interlaces. Further, in some aspects, the first timeline-dependent DMRS pattern includes a front pilot symbol and a middle pilot symbol for DMRS transmission and the second timeline-dependent DMRS pattern includes a front pilot symbol and an end pilot symbol for DMRS transmission. Moreover, in some aspects, a symbol position of the DMRS 140 may be based on a number of HARQ interlaces. Additionally, in some aspects, the one or more deployment characteristics correspond to a communication timeline of the UE.

In some aspects, the DMRS pattern 134 may correspond to at least one of a transmission DMRS pattern including a first DMRS symbol arrangement or a retransmission DMRS pattern including a second DMRS symbol arrangement. Further, in some aspects, the first DMRS symbol arrangement may include a front pilot symbol and a middle pilot symbol for DMRS transmission and the second DMRS symbol arrangement includes a front pilot symbol for DMRS transmission. In addition, in some aspects, the one or more deployment characteristics may correspond to a redundancy version (RV), HARQ process identifier (ID) for the UE 115.

In some aspects, the uplink transmission configuration indication may further include a transmission rank greater than or equal to rank '1', such that the DMRS pattern 134 corresponds to a distinct DMRS pattern based on the transmission rank. Further, in some aspects, the transmission rank may correspond to at least one of rank '1', rank '2', or rank '4'. Additionally, the one or more deployment characteristics may correspond to the transmission rank.

In some aspects, the DMRS pattern 134 may correspond to a distinct DMRS pattern associated with at least one of a Doppler level or a delay spread. Further, in some aspects, the distinct DMRS pattern includes at least one of a first DMRS pattern associated with a low Doppler level and including at least one DMRS symbol position, a second DMRS pattern associated with a medium Doppler level and including at least two DMRS symbol positions, or a third DMRS pattern associated with a high Doppler level and including at least three DMRS symbol positions. Moreover, in some aspects, the one or more deployment characteristics correspond to a communication channel condition.

In some aspects, the DMRS pattern 134 may correspond to a distinct DMRS pattern associated with a respective MU-MIMO layer. Further, in some aspects, the distinct DMRS pattern may include at least one of a first multi-user DMRS pattern associated with a first layer and including at least one DMRS symbol position, or a second multi-user DMRS pattern associated with a second layer and including at least two DMRS symbol positions. Moreover, in some aspects, the one or more deployment characteristics correspond to one or more MU-MIMO layers.

In some aspects, the DMRS pattern 134 may include a nested DMRS pattern for multiplexing of distinct DMRS patterns in one or more transmission resources.

At block 906, the method 900 may transmit, to the UE, an uplink transmission configuration indication including the DMRS pattern for configuring DMRS transmission on an uplink communication channel, the DMRS pattern associated with the one or more deployment characteristics. In an aspect, for example, the network entity 105 (FIG. 1B) and/or DMRS pattern determination component 131 (FIG. 1B) may transmit, to the UE 115 (FIG. 1B), an uplink transmission configuration indication including the DMRS pattern 134 (FIG. 1B) for configuring DMRS transmission on an uplink communication channel, the DMRS pattern 134 associated with the one or more deployment characteristics.

In some aspects, the uplink transmission configuration indication is transmitted via RRC signaling from the network entity 105. In some aspects, the uplink transmission configuration indication is transmitted on a downlink control channel from the network entity 105.

At block 908, the method 900 may receive a DMRS from the UE on an uplink channel in accordance with the DMRS pattern. In an aspect, for example, the network entity 105 (FIG. 1B) and/or DMRS pattern determination component 131 (FIG. 1B) may receive a DMRS 140 (FIG. 1A) from the UE 115 on an uplink channel in accordance with the DMRS pattern 134.

Figure 10:
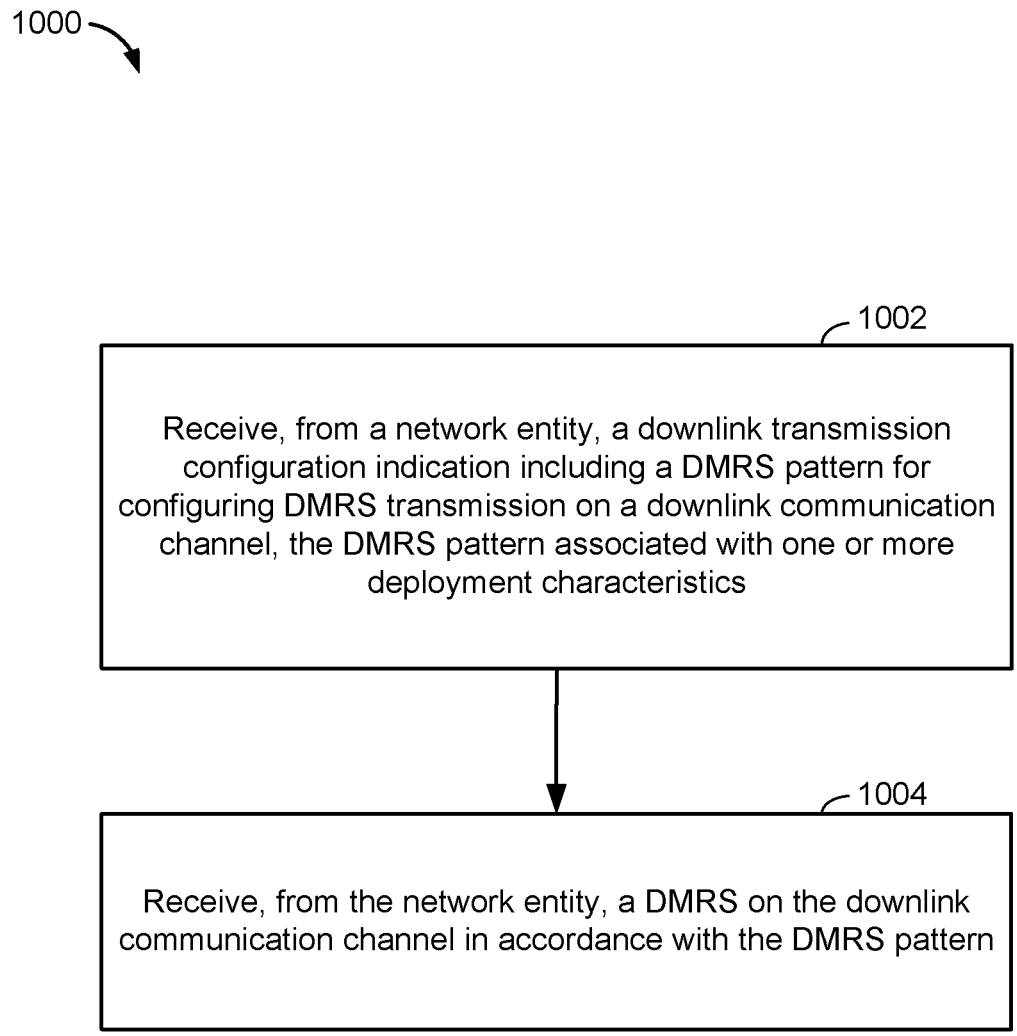
FIG. 10 is a flow diagram illustrating an exemplary method of communication at a user equipment in a wireless communication system in accordance with one or more exemplary aspects.

FIG. 10 is a flow diagram illustrating examples of a method 1000 related to DMRS reception in accordance with various aspects of the present disclosure. Although the operations described below are presented in a particular order and/or as being performed by an example component, the ordering of the actions and the components performing the actions may be varied, depending on the implementation. Also, although the reference signal component 130 (FIG. 1A) is illustrated as having a number of subcomponents, it should be understood that one or more of the illustrated subcomponents may be separate from, but in communication with, the reference signal component 130, and/or each other. Moreover, any of actions or components described below with respect to the reference signal component 130 and/or any subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

In an aspect, at block 1002, the method 1000 may receive, from a network entity, a downlink transmission configuration indication including a DMRS pattern for configuring DMRS transmission on a downlink communication channel, the DMRS pattern associated with one or more deployment characteristics. In an aspect, for example, the UE 115 (FIG. 1A) may execute the reference signal component 130 (FIG. 1A) and/or the transceiver 60 (FIG. 1A) to receive, from a network entity 105 (FIG. 1A), an downlink transmission configuration indication including a DMRS pattern 134 (FIG. 1A) for configuring DMRS transmission on a downlink communication channel, the DMRS pattern 134 associated with one or more deployment characteristics.

In some aspects, the DMRS pattern 134 may correspond to at least one of a first timeline-dependent DMRS pattern having one HARQ interlace or a second timeline-dependent DMRS pattern having two or more HARQ interlaces. Further, in some aspects, the first timeline-dependent DMRS pattern includes a front pilot symbol and a middle pilot symbol for DMRS transmission and the second timeline-dependent DMRS pattern includes a front pilot symbol and an end pilot symbol for DMRS transmission. Moreover, in some aspects, a symbol position of the DMRS 140 may be based on a number of HARQ interlaces. Additionally, in some aspects, the one or more deployment characteristics correspond to a communication timeline of the UE.

In some aspects, the DMRS pattern 134 may correspond to at least one of a transmission DMRS pattern including a first DMRS symbol arrangement or a retransmission DMRS pattern including a second DMRS symbol arrangement. Further, in some aspects, the first DMRS symbol arrangement may include a front pilot symbol and a middle pilot symbol for DMRS transmission and the second DMRS symbol arrangement includes a front pilot symbol for DMRS transmission. In addition, in some aspects, the one or more deployment characteristics may correspond to a RV, HARQ process ID for the UE 115.

In some aspects, the downlink transmission configuration indication may further include a transmission rank greater than or equal to rank '1', such that the DMRS pattern 134 corresponds to a distinct DMRS pattern based on the transmission rank. Further, in some aspects, the transmission rank may correspond to at least one of rank '1', rank '2', or rank '4'. Additionally, the one or more deployment characteristics may correspond to the transmission rank.

In some aspects, the DMRS pattern 134 may correspond to a distinct DMRS pattern associated with at least one of a Doppler level or a delay spread. Further, in some aspects, the distinct DMRS pattern includes at least one of a first DMRS pattern associated with a low Doppler level and including at least one DMRS symbol position, a second DMRS pattern associated with a medium Doppler level and including at least two DMRS symbol positions, or a third DMRS pattern associated with a high Doppler level and including at least three DMRS symbol positions. Moreover, in some aspects, the one or more deployment characteristics correspond to a communication channel condition.

In some aspects, the DMRS pattern 134 may correspond to a distinct DMRS pattern associated with a respective MU-MIMO layer. Further, in some aspects, the distinct DMRS pattern may include at least one of a first multi-user DMRS pattern associated with a first layer and including at least one DMRS symbol position, or a second multi-user DMRS pattern associated with a second layer and including at least two DMRS symbol positions. Moreover, in some aspects, the one or more deployment characteristics correspond to one or more MU-MIMO layers.

In some aspects, the DMRS pattern 134 may include a nested DMRS pattern for multiplexing of distinct DMRS patterns in one or more transmission resources. In some aspects, the uplink transmission configuration indication may be received via RRC signaling from the network entity 105. In some aspects, the downlink transmission configuration indication may be received on a downlink control channel from the network entity 105.

At block 1004, the method 1000 may receive, from the network entity, a DMRS on the downlink communication channel in accordance with the DMRS pattern. In an aspect, for example, the UE 115 (FIG. 1A) may execute the reference signal component 130 (FIG. 1A) and/or DMRS transmission component 132 to receive a DMRS 140 (FIG. 1A) from the network entity 105 on the downlink communication channel in accordance with the DMRS pattern 134.

Figure 11:
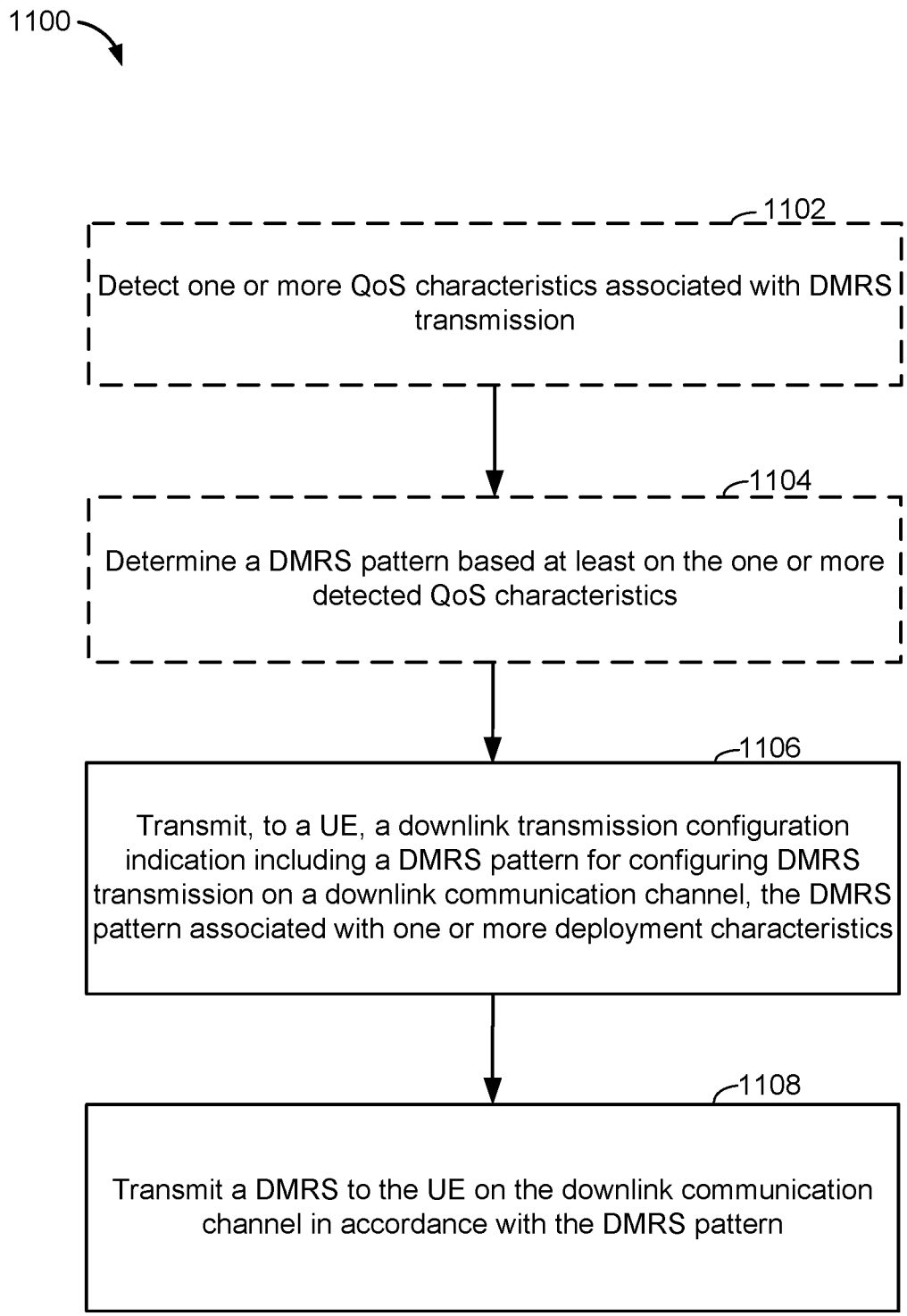
FIG. 11 is a flow diagram illustrating an exemplary method of communication at a network entity in accordance with one or more exemplary aspects.

FIG. 11 is a flow diagram illustrating examples of a method 1100 related to communication by a network entity in accordance with aspects of the present disclosure. Although the operations described below are presented in a particular order and/or as being performed by an example component, it should be understood that the ordering of the actions and the components performing the actions may be varied, depending on the implementation. Also, although the DMRS pattern determination component 131 (FIG. 1B) is illustrated as having a number of subcomponents, it should be understood that one or more of the illustrated subcomponents may be separate from, but in communication with, the DMRS pattern determination component 131, and/or each other. Moreover, it should be understood that any of actions or components described below with respect to the DMRS pattern determination component 131 and/or its subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

At block 1102, the method 1100 may optionally detect one or more deployment characteristics associated with DMRS transmission. In an aspect, for example, the network entity 105 (FIG. 1B) and/or DMRS pattern determination component 131 (FIG. 1B) may detect one or more deployment characteristics associated with DMRS transmission. In some aspects, the one or more deployment characteristics may be measurement information received from the UE 115 (FIG. 1B) or detected by the network entity 105.

Further, at block 1104, the method 1100 may optionally determine a DMRS pattern based at least on the one or more detected deployment characteristics. In an aspect, for example, the network entity 105 (FIG. 1B) and/or DMRS pattern determination component 131 (FIG. 1B) may determine a DMRS pattern based at least on the one or more detected deployment characteristics.

In some aspects, the DMRS pattern 134 may correspond to at least one of a first timeline-dependent DMRS pattern having one HARQ interlace or a second timeline-dependent DMRS pattern having two or more HARQ interlaces. Further, in some aspects, the first timeline-dependent DMRS pattern includes a front pilot symbol and a middle pilot symbol for DMRS transmission and the second timeline-dependent DMRS pattern includes a front pilot symbol and an end pilot symbol for DMRS transmission. Moreover, in some aspects, a symbol position of the DMRS 140 may be based on a number of HARQ interlaces. Additionally, in some aspects, the one or more deployment characteristics correspond to a communication timeline of the UE.

In some aspects, the DMRS pattern 134 may correspond to at least one of a transmission DMRS pattern including a first DMRS symbol arrangement or a retransmission DMRS pattern including a second DMRS symbol arrangement. Further, in some aspects, the first DMRS symbol arrangement may include a front pilot symbol and a middle pilot symbol for DMRS transmission and the second DMRS symbol arrangement includes a front pilot symbol for DMRS transmission. In addition, in some aspects, the one or more deployment characteristics may correspond to a RV, HARQ process ID for the UE 115.

In some aspects, the downlink transmission configuration indication may further include a transmission rank greater than or equal to rank '1', such that the DMRS pattern 134 corresponds to a distinct DMRS pattern based on the transmission rank. Further, in some aspects, the transmission rank may correspond to at least one of rank '1', rank '2', or rank '4'. Additionally, the one or more deployment characteristics may correspond to the transmission rank.

In some aspects, the DMRS pattern 134 may correspond to a distinct DMRS pattern associated with at least one of a Doppler level or a delay spread. Further, in some aspects, the distinct DMRS pattern includes at least one of a first DMRS pattern associated with a low Doppler level and including at least one DMRS symbol position, a second DMRS pattern associated with a medium Doppler level and including at least two DMRS symbol positions, or a third DMRS pattern associated with a high Doppler level and including at least three DMRS symbol positions. Moreover, in some aspects, the one or more deployment characteristics correspond to a communication channel condition.

In some aspects, the DMRS pattern 134 may correspond to a distinct DMRS pattern associated with a respective MU-MIMO layer. Further, in some aspects, the distinct DMRS pattern may include at least one of a first multi-user DMRS pattern associated with a first layer and including at least one DMRS symbol position, or a second multi-user DMRS pattern associated with a second layer and including at least two DMRS symbol positions. Moreover, in some aspects, the one or more deployment characteristics correspond to one or more MU-MIMO layers.

In some aspects, the DMRS pattern 134 may include a nested DMRS pattern for multiplexing of distinct DMRS patterns in one or more transmission resources.

At block 1006, the method 1000 may transmit, to the UE, a downlink transmission configuration indication including the DMRS pattern for configuring DMRS transmission on a downlink communication channel, the DMRS pattern associated with the one or more deployment characteristics. In an aspect, for example, the network entity 105 (FIG. 1B) and/or DMRS pattern determination component 131 (FIG. 1B) may transmit, to the UE 115 (FIG. 1B), a downlink transmission configuration indication including the DMRS pattern 134 (FIG. 1B) for configuring DMRS transmission on a downlink communication channel, the DMRS pattern 134 associated with the one or more deployment characteristics.

In some aspects, the downlink transmission configuration indication is transmitted via RRC signaling from the network entity 105. In some aspects, the downlink transmission configuration indication is transmitted on a downlink control channel from the network entity 105.

At block 1008, the method 1000 may transmit a DMRS to the UE on the downlink communication channel in accordance with the DMRS pattern. In an aspect, for example, the network entity 105 (FIG. 1B) and/or DMRS pattern determination component 131 (FIG. 1B) may transmit a DMRS 140 (FIG. 1A) to the UE 115 on the downlink communication channel in accordance with the DMRS pattern 134.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is communicatively coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of demodulation reference signal (DMRS) transmission by a user equipment (UE), comprising:
   receiving, from a network entity, an uplink transmission configuration indication including a DMRS pattern for configuring DMRS transmission on an uplink communication channel, the DMRS pattern associated with one or more deployment characteristics, wherein the DMRS pattern corresponds to at least one of a first timeline-dependent DMRS pattern having one hybrid automatic repeat request (HARQ) interlace or a second timeline-dependent DMRS pattern having two or more HARQ interlaces; and
   transmitting a DMRS to the network entity on the uplink communication channel in accordance with the DMRS pattern.

2. The method of claim 1, wherein the first timeline-dependent DMRS pattern includes a first front pilot symbol and a middle pilot symbol for DMRS transmission and the second timeline-dependent DMRS pattern includes a second front pilot symbol and an end pilot symbol for DMRS transmission.

3. The method of claim 1, wherein a symbol position of the DMRS is based on a number of HARQ interlaces.

4. The method of claim 1, wherein the one or more deployment characteristics correspond to a communication timeline of the UE.

5. The method of claim 1, further comprising receiving another uplink transmission configuration indication including a distinct DMRS pattern for configuring DMRS transmission on the uplink communication channel, wherein the distinct DMRS pattern corresponds to at least one of a transmission DMRS pattern including a first DMRS symbol arrangement or a retransmission DMRS pattern including a second DMRS symbol arrangement.

6. The method of claim 5, wherein the first DMRS symbol arrangement includes a front pilot symbol and a middle pilot symbol for DMRS transmission and the second DMRS symbol arrangement includes a front pilot symbol for DMRS transmission.

7. The method of claim 5, wherein the one or more deployment characteristics correspond to a redundancy version (RV) HARQ process identifier (ID) for the UE.

8. The method of claim 1, wherein the uplink transmission configuration indication further includes a transmission rank greater than or equal to rank '1', and wherein the DMRS pattern corresponds to a distinct DMRS pattern based on the transmission rank.

9. The method of claim 8, wherein the transmission rank corresponds to at least one of rank '1', rank '2', or rank '4'.

10. The method of claim 1, wherein the one or more deployment characteristics correspond to the transmission rank.

11. The method of claim 1, further comprising receiving another uplink transmission configuration indication including a distinct DMRS pattern associated with at least one of a Doppler level or a delay spread.

12. The method of claim 11, wherein the distinct DMRS pattern includes at least one of:
   a first DMRS pattern associated with a low Doppler level and including at least one DMRS symbol position,
   a second DMRS pattern associated with a medium Doppler level and including at least two DMRS symbol positions, or
   a third DMRS pattern associated with a high Doppler level and including at least three DMRS symbol positions.

13. The method of claim 11, wherein the one or more deployment characteristics correspond to a communication channel condition.

14. The method of claim 1, further comprising receiving another uplink transmission configuration indication including a distinct DMRS pattern associated with a respective multi-user multiple-input multiple-output (MU-MIMO) layer.

15. The method of claim 14, wherein the distinct DMRS pattern includes at least one of:
   a first multi-user DMRS pattern associated with a first layer and including at least one DMRS symbol position, or
   a second multi-user DMRS pattern associated with a second layer and including at least two DMRS symbol positions.

16. The method of claim 14, wherein the one or more deployment characteristics correspond to one or more MU-MIMO layers.

17. The method of claim 1, further comprising receiving another uplink transmission configuration indication including a nested DMRS pattern for multiplexing of distinct DMRS patterns in one or more transmission resources.

18. An apparatus for demodulation reference signal (DMRS) transmission, comprising:
   a memory; and
   a processor communicatively coupled to the memory and configured to:
      receive, from a network entity, an uplink transmission configuration indication including a DMRS pattern for configuring DMRS transmission on an uplink communication channel, the DMRS pattern associated with one or more quality of service (QoS) characteristics, wherein the DMRS pattern corresponds to at least one of a first timeline-dependent DMRS pattern having one hybrid automatic repeat request (HARQ) interlace or a second timeline-dependent DMRS pattern having two or more HARQ interlaces; and
      transmit a DMRS to the network entity on the uplink communication channel in accordance with the DMRS pattern.

19. The apparatus of claim 18, further comprising receiving another uplink transmission configuration indication including a transmission DMRS pattern including a first DMRS symbol arrangement or a retransmission DMRS pattern including a second DMRS symbol arrangement.

20. The apparatus of claim 18, wherein the uplink transmission configuration indication further includes a transmission rank greater than or equal to rank '1', and wherein the DMRS pattern corresponds to a distinct DMRS pattern based on the transmission rank.

21. The apparatus of claim 20, wherein the transmission rank corresponds to at least one of rank '1', rank '2', or rank '4'.

22. The apparatus of claim 18, further comprising receiving another uplink transmission configuration indication including a distinct DMRS pattern associated with at least one of a Doppler level or a delay spread.

23. The apparatus of claim 18, further comprising receiving another uplink transmission configuration indication including a distinct DMRS pattern associated with a respective multi-user multiple-input multiple-output (MU-MIMO) layer.

24. The apparatus of claim 18, further comprising receiving another uplink transmission configuration indication including a nested DMRS pattern for multiplexing of distinct DMRS patterns in one or more transmission resources.

25. A method of communication at a network entity, comprising:
   transmitting, to a user equipment (UE), an uplink transmission configuration indication including a DMRS pattern for configuring DMRS transmission on an uplink communication channel, the DMRS pattern associated with one or more deployment characteristics, wherein the DMRS pattern corresponds to at least one of a first timeline-dependent DMRS pattern having one hybrid automatic repeat request (HARQ) interlace or a second timeline-dependent DMRS pattern having two or more HARQ interlaces; and
   receiving a DMRS from the UE on the uplink communication channel in accordance with the DMRS pattern.

26. The method of claim 25, further comprising:
   detecting the one or more deployment characteristics associated with the DMRS transmission; and
   determining the DMRS pattern based at least on the one or more deployment characteristics.

27. An apparatus for communication at a network entity, comprising:
   a memory; and
   a processor communicatively coupled to the memory and configured to:
      transmit, to a user equipment (UE), an uplink transmission configuration indication including a DMRS pattern for configuring DMRS transmission on an uplink communication channel, the DMRS pattern associated with one or more deployment characteristics, wherein the DMRS pattern corresponds to at least one of a first timeline-dependent DMRS pattern having one hybrid automatic repeat request (HARQ) interlace or a second timeline-dependent DMRS pattern having two or more HARQ interlaces; and
      receive a DMRS from the UE on the uplink communication channel in accordance with the DMRS pattern.

28. The apparatus of claim 27, wherein the processor is further configured to:
   detect the one or more deployment characteristics associated with the DMRS transmission; and
   determine the DMRS pattern based at least on the one or more deployment characteristics.

* * * * *